United States Patent
Reial et al.

(10) Patent No.: US 8,447,237 B2
(45) Date of Patent: May 21, 2013

(54) INTERFERENCE AVOIDANCE IN WHITE SPACE COMMUNICATION SYSTEMS

(75) Inventors: Andres Reial, Malmö (SE); Christian Bergljung, Lund (SE); Anders Rosenqvist, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 491 days.

(21) Appl. No.: 12/758,741

(22) Filed: Apr. 12, 2010

(65) Prior Publication Data

US 2011/0250857 A1    Oct. 13, 2011

(51) Int. Cl.
*H04B 1/00* (2006.01)
*H04B 15/00* (2006.01)

(52) U.S. Cl.
USPC ........................ 455/63.1; 455/561

(58) Field of Classification Search
USPC ............ 455/447, 448, 450, 452.1, 509, 63.1, 455/63.4, 66.1, 67.11, 561, 562.1
See application file for complete search history.

(56) References Cited

U.S. PATENT DOCUMENTS

| | | | |
|---|---|---|---|
| 5,884,192 | A | 3/1999 | Karlsson et al. |
| 7,088,956 | B2 | 8/2006 | Kishigami et al. |
| 7,359,733 | B2 | 4/2008 | Liang et al. |
| 8,150,399 | B2 * | 4/2012 | Wong et al. .................. 455/443 |
| 2004/0248512 | A1 | 12/2004 | Munoz et al. |
| 2005/0272370 | A1 | 12/2005 | Schiff |
| 2006/0067354 | A1 | 3/2006 | Waltho |
| 2007/0082609 | A1 | 4/2007 | Kiesling |
| 2008/0090575 | A1 | 4/2008 | Barak et al. |
| 2008/0112359 | A1 | 5/2008 | Cleveland et al. |
| 2008/0130519 | A1 | 6/2008 | Bahl et al. |
| 2008/0165680 | A1 | 7/2008 | Chang |
| 2008/0212725 | A1 | 9/2008 | Tang |
| 2008/0259859 | A1 | 10/2008 | Cordeiro et al. |
| 2008/0268892 | A1 | 10/2008 | Hamdi et al. |
| 2009/0061779 | A1 | 3/2009 | Gurney et al. |
| 2009/0081955 | A1 | 3/2009 | Necker |

(Continued)

FOREIGN PATENT DOCUMENTS

| | | |
|---|---|---|
| EP | 2161956 A1 | 3/2010 |
| WO | 2008/013429 A2 | 1/2008 |
| WO | 2008/039872 A2 | 4/2008 |
| WO | 2008144323 A1 | 11/2008 |

OTHER PUBLICATIONS

Cordeiro et al. "IEEE 802.22: An introduction to the First Wireless Standard based on Cognitive Radios", Journal of Communications, vol. 1, No. 1, Apr. 2006.

(Continued)

*Primary Examiner* — Ping Hsieh
(74) *Attorney, Agent, or Firm* — Potomac Patent Group PLLC

(57) ABSTRACT

Mobile communication system equipment avoids interfering with another transmitter's operation. Sensing information indicating whether the other transmitter's signal has been detected is received from remote sensors, wherein each of the remote sensors is situated at a respective one of two or more sensor locations. The sensing information and information about the sensor locations is used to ascertain one or more exclusion boundaries needed to avoid interfering with the other transmitter's use of the spectral resource. Beamforming parameters are ascertained that will enable the main node to transmit within one or more predefined geographical areas except for any portion of a predefined area located on a far side of the one or more exclusion boundaries. Two or more adjusted signals are produced as a function of the beamforming parameters and one or more signals to be transmitted. The adjusted signals are transmitted from respective ones of two or more antennas.

18 Claims, 5 Drawing Sheets

U.S. PATENT DOCUMENTS

2009/0117859 A1    5/2009   Smith et al.
2009/0124205 A1    5/2009   Aboba et al.
2009/0124208 A1    5/2009   Mody et al.
2009/0163221 A1    6/2009   Abedi
2010/0304680 A1*  12/2010   Kuffner et al. ............... 455/63.1

OTHER PUBLICATIONS

Sahai, A. et al. "Cognitive Radios for Spectrum Sharing", IEEE Signal Processing Magazine, pp. 140-145, 2009.

Zhang, R. et al. "Channel with QoS Constraints", IEEE Transactions on Signal Processing, vol. 57, No. 2, Feb. 2009, pp. 726-737.

PCT International Search Report, mailed Jun. 27, 2011, in connection with counterpart International Application No. PCT/EP2011/055430.

PCT Written Opinion, mailed Jun. 27, 2011, in connection with International Application No. PCT/EP2011/055430.

* cited by examiner

FIG. 1
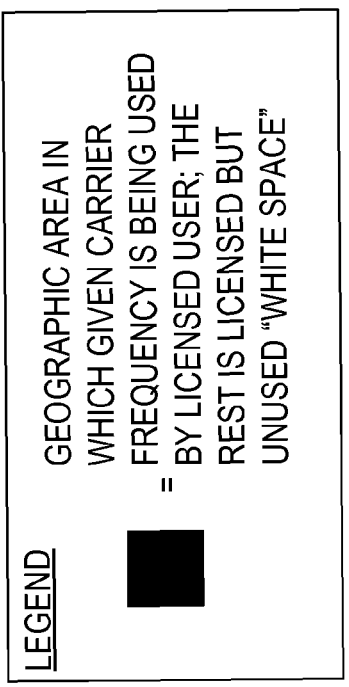

INTERFERENCE AVOIDANCE IN WHITE SPACE COMMUNICATION SYSTEMS

BACKGROUND

The present invention relates to wireless communications, and more particularly to the sensing and protecting of wireless transmissions from a user of a spectral resource.

The radio spectrum is a limited resource that should be shared between many different types of equipment such as cellular, home network, broadcast, and military communication equipment. Historically, each part of the radio spectrum has been allocated (e.g., in a country- or region-wide basis) to a certain use (called a "licensed" and/or "primary" use), such as only for television ("TV") or only for particular types of wireless communications. This strategy has resulted in all applications/uses being disallowed on the allocated carrier frequency except for those applications included in the license agreement.

There are clear advantages to using dedicated spectrum for wireless communications at least in that, because the frequency band in question is reserved, no interference from other systems should occur. This yields predictable network capacity and quality of service.

However, in practice, the dedication of portions of the radio spectrum to one or only a few types of users results in large parts of the radio spectrum being unused much of the time. For instance, in the Ultra-High Frequency (UHF) band, where TV broadcasts take place, large geographical areas are unused, mainly due to the large output power needed for such applications; this large output power compels a large reuse distance in order to minimize the risk of interference. An example of such geographical areas within Scandinavia is illustrated in FIG. 1. In FIG. 1, the shaded areas represent geographic locations in which a given carrier frequency is being used by a licensed user (e.g., by Broadcast TV). In the remaining areas, the so-called "white spaces", the given carrier frequency is allocated to the licensed user but is not actually being used by that user.

In order to make better use of the licensed spectral resources, some countries will, in the future, allow unlicensed services (so called "secondary" uses) to take place in areas (called "white spaces") in which the licensed (primary or "incumbent") user is not transmitting. However the primary/incumbent user will always have priority for the use of the spectrum to the exclusion of others. Therefore, some sort of mechanism needs to be in place to ensure that there is only a low probability that the unlicensed users are causing interference to the licensed user.

One mechanism is to install the unlicensed network in a geographical area where at least some parts of the licensed spectra are known to be unused.

However, even more use of the white space can be made if the non-interference mechanism adopts a detection strategy in which it operates on the licensed frequency (or frequencies) in the white space only so long as no licensed user transmissions are detected, and ceases such operation as soon as licensed user transmissions are detected. In this context, ceasing operation may mean ceasing all operation, or alternatively may mean ceasing operation only on those frequencies that are detected as being "in use", and otherwise continuing to operate on other frequencies in the white space. The most straightforward sensor is a signature detector adapted to detect specific signatures transmitted from the licensed/primary user (typically implemented as a matched filer). An example of a white space system currently being standardized is IEEE 802.22. An overview of this system can be found in Cordeiro et al, "IEEE 802.22: An introduction to the First Wireless Standard based on Cognitive Radios", Journal of Communications, Vol 1, No 1, April 2006.

In commercial embodiments, the higher cost of signature detectors may make them unfeasible. As a less expensive alternative, sensors can be implemented to function as received power detectors. These essentially compare a received power level on a white space given frequency and compare this with a threshold level. So long as the received power level is below the threshold power level, the incumbent equipment can be considered to not be in use.

Both of the previously described approaches of ascertaining white space spectrum availability are, in a sense, all-or-nothing approaches. When the lack of interference to the incumbent is ensured by the choice of the geographical location, the white space spectrum utilization is static in its nature. Thus, only the location and frequency band combinations with no activity at any time are considered, which may be a significant limitation. When the sensor signals are used as spectrum availability indications, the frequency band in question is activated or deactivated in the whole area.

It remains a desirable goal to provide improved methods and apparatuses that allow non-incumbent equipment to operate in a white space area without disturbing operation by incumbent equipment.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses in which mobile communication system equipment is operated in a manner that avoids interfering with another transmitter's use of a spectral resource, wherein the mobile communication system equipment includes a main node that serves a plurality of user equipments. Such operation includes operating the main node to receive, from each one of two or more remote sensors, sensing information that indicates whether a signal from said another transmitter has been detected, wherein each of the remote sensors is situated at a respective one of two or more sensor locations. The sensing information and information about the sensor locations is used to ascertain one or more exclusion boundaries needed to avoid interfering with the other transmitter's use of the spectral resource. Beamforming parameters that will enable the main node to transmit within one or more predefined geographical areas except for any portion of a predefined area located on a far side of the one or more exclusion boundaries are ascertained, and two or more adjusted signals are produced as a function of the beamforming parameters and one or more signals to be transmitted. The two or more adjusted signals are then transmitted from respective ones of two or more antennas.

In some embodiments, correlation results are generated by correlating information about detected transmissions of the other transmitter with information about contemporaneous transmissions of the mobile communication system. The correlation results are used to detect one or more erroneous indications that the signal from said another transmitter was detected.

In an aspect of some embodiments consistent with the invention, the sensing information indicates whether the signal from the other transmitter has been detected in one frequency band.

In some alternative embodiments, the sensing information indicates whether the signal from the other transmitter has been detected in any of a plurality of frequency bands. In some of such embodiments, it is further possible to ascertain beamforming parameters on a per-frequency-band basis, wherein for each frequency band, corresponding beamforming parameters enable the main node to transmit within one or more predefined geographical areas except for any portion of a predefined area located on a far side of one or more exclusion boundaries associated with the frequency band.

In yet other alternative embodiments, beamforming parameters are modified over time in correspondence with modifications in transmission activity of said another transmitter.

In still other embodiments, operation includes receiving, from each one of two or more remote sensors, sensing information that indicates whether a signal transmitted by a transmitter associated with the main node was received at or above a predefined threshold power level in any portion of the predefined area located on the far side of the one or more exclusion boundaries. The beamforming parameters can be adjusted if the sensing information does indicate that the signal transmitted by the transmitter associated with the main node was received at or above the predefined threshold power level in any portion of the predefined area located on the far side of the one or more exclusion boundaries.

In still another aspect of some embodiments, this sensing and beamformer adjusting operation is performed iteratively until the sensing information does not indicate that the signal transmitted by the transmitter associated with the main node was received at or above the predefined threshold power level in any portion of the predefined area located on the far side of the one or more exclusion boundaries.

BRIEF DESCRIPTION OF THE DRAWINGS

The objects and advantages of the invention will be understood by reading the following detailed description in conjunction with the drawings in which:

FIG. 1 illustrates geographical areas constituting so-called "white spaces" located in Scandinavia.

DETAILED DESCRIPTION

Figure 2:
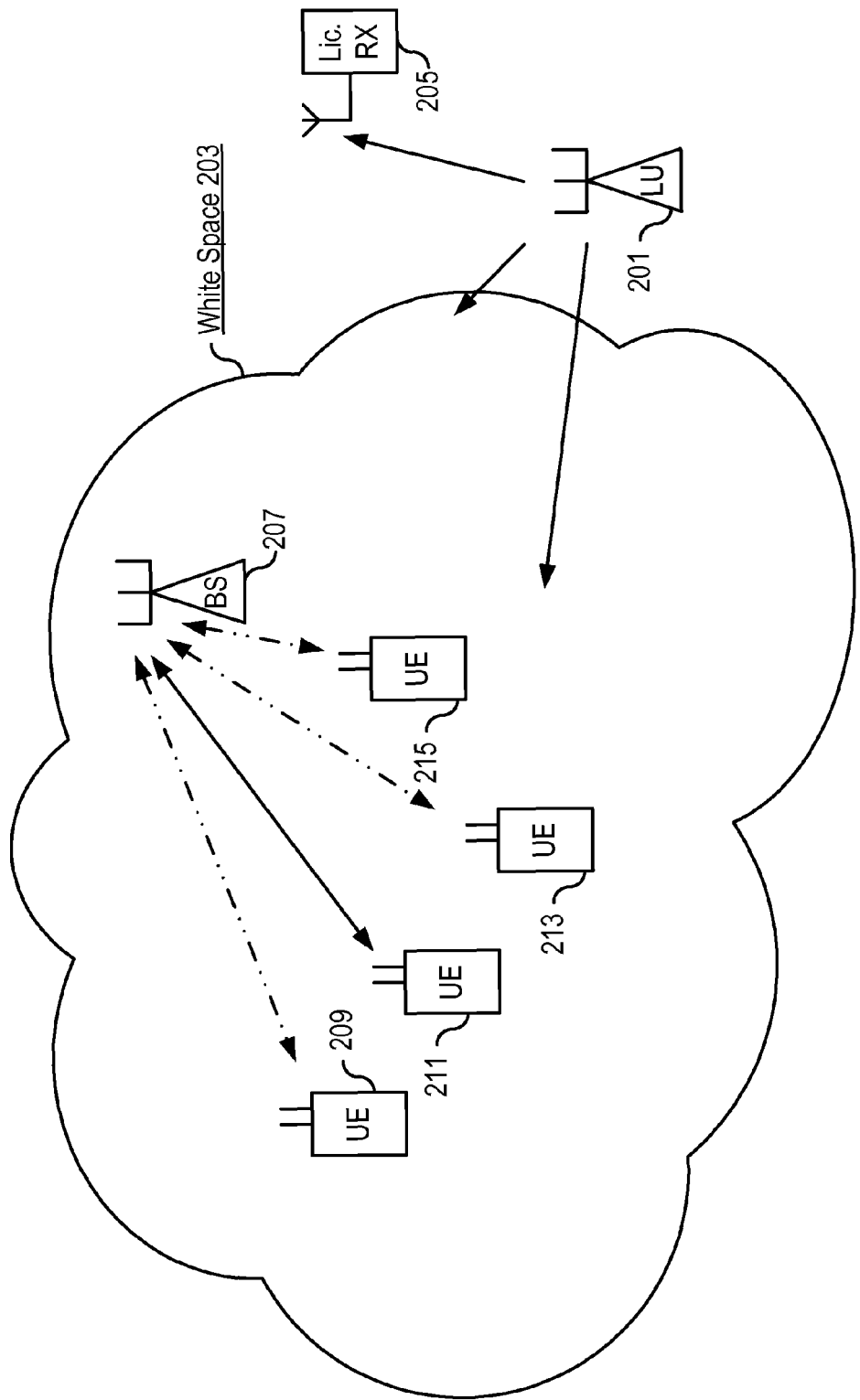
FIG. 2 is a block diagram of an exemplary system in which various aspects of the invention are deployed and utilized.

The various features of the invention are described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function, application specific integrated circuits made in accordance with logic flows described herein, etc.), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

Modern base stations and mobile terminals typically include two or more antennas to enable the use of Multiple Input Multiple Output (MIMO) techniques during data reception and/or transmission. In an aspect of embodiments consistent with the invention, white space spectrum availability is increased by using signals from a set of spatially distributed sensors to determine the regions of potential inference to the incumbent spectrum owner. In another aspect, the multiple transmitter antennas associated with wireless network base stations are used to beam-form the transmitted signals so that the areas of potential interference are excluded. The beamforming may be done on a per-frequency-band basis, in order to maximize the usage of each frequency band.

These and other aspects will now be described in further detail in the following.

In order to provide a context for understanding the utility of embodiments consistent with the invention, an application will be presented in which a cellular communication system having mobile terminals (so-called "User Equipments", or "UEs") served by a serving base station are called upon to perform white space sensing due to their unlicensed operation in a white space, as discussed in the Background section above. The base station adapts its operation in accordance with the sensing results. It will be understood that this context is presented merely for the purposes of illustration and is not intended to limit the scope of the invention. To the contrary, those of ordinary skill in the art will recognize that many types of networks other than cellular telecommunication systems may be adapted in accordance with the various inventive principles to enable white space operation in a manner that avoids interfering with incumbent equipment.

FIG. 2 is a block diagram of an exemplary system in which UEs are configured to perform white space sensing, the results of which are reported to a base station which then adapts its operations accordingly. In this example, a licensed user (LU) 201 is depicted operating within a geographic area that includes a white space 203. Transmissions of the licensed user 201 are intended to be received by, for example, one or more licensed receivers, only one of which (the licensed receiver 205) is depicted. A mobile communication system is configured in accordance with various aspects of the invention to permit it to operate as an unlicensed user within the white space 203. The mobile communication system includes a serving base station 207 that serves one or more UEs, including the UEs 209, 211, 213, and 215. In the context of the invention, the base station 205 exemplifies a "main node" that comprises circuitry configured to perform the functions described below. In other embodiments different equipment constitutes the "main node." For example, in WLAN systems, a router can operate as a main node in the context of the invention. To facilitate readability of this document, the well-known term "base station" is used herein as a generic term that covers not only base stations in the traditional sense, but also all forms of radio access nodes in all forms of radio access technologies, of which cellular communication equipment and WLAN technology are but two examples.

Each of the UEs 209, 211, 213, and 215 includes circuitry configured to perform white space sensing in any of a number of ways. For example, as mentioned in the Background section, the most straightforward sensor is a signature detector adapted to detect specific signatures transmitted from the licensed/primary user (typically implemented as a matched filer). Alternatively, the circuitry configured to perform white space sensing can be implemented as a power level detector, also as described in the Background section. The sensing data generated by the UEs 209, 211, 213, and 215 is communicated to the base station 207 which, as will be described further in connection with FIGS. 3, 4, and 5, includes circuitry configured in accordance with the inventive principles described herein to enable some level of unlicensed operation while avoiding interference to the licensed user 201.

A typical white space network WS NW has a network of sensors distributed over the planned coverage area. These can be either wireless units as just discussed (e.g., special-purpose units, modified UEs, or standard user terminals) or wired units. The location of all the sensors is roughly or exactly known. By associating the information contained in the reporting signals with the locations of the reporting sensors, the network can construct an interference map (i.e., identify the areas where the incumbent signals are and are not present).

Modern base stations typically are equipped with 2-4 transmitter (TX) antennas per sector. In accordance with an aspect of embodiments consistent with the invention, the several transmitter antennas are used in an interference avoidance strategy as follows.

It is well known that multiple antennas may be used for precoding and beamforming. Beamforming is achieved by transmitting the same signal from all antennas, but applying individual phase shifts and attenuation values to the individual antenna signals. By suitably choosing these values, as well as by using electrical downtilt features, the beam shapes may be tuned quite exactly, resulting in exact desired coverage patterns.

In traditional networks, beamforming is used to direct signal energy towards the intended recipient(s) of the signal. However, in embodiments consistent with an aspect of the invention, rather than directing a beam towards a particular target, a completely different approach is taken in which beam shapes are tuned in a manner that excludes particular geographical regions, and in the context of white space operation, excludes those geographical regions in which incumbent signals have been detected within the network's standard coverage area. This coverage modification concept is illustrated graphically in FIG. 3.

In particular, a base station 301 serves UEs located in any of three cell sectors: a first sector 303, a second sector 305, and a third sector 307. Three incumbent communication systems are located in the vicinity, represented in this example by three television transmitters: a first television transmitter ("TV1"), a second television transmitter ("TV2") and a third television transmitter ("TV3"). The first, second and third television transmitters TV1, TV2, TV3 have respective first, second, and third signal coverage areas 309, 311, 313. Each signal coverage area is a geographical region within which a signal transmitted by the associated television transmitter is strong enough to, with a given probability, be "heard" and therefore received by a receiver.

In the present example, the first and second signal coverage areas 309, 311 overlap portions of the cell sectors 303, 305, 307, whereas the third coverage area 313 does not. In accordance with an aspect of embodiments consistent with the invention, the base station 301 determines those portions of its first, second and third sectors 303, 305, 307 that should be excluded from its service areas. In this example, these are first and second exclusion areas 315, 317, which are defined by respective first and second exclusion boundaries 319, 321. Each of the exclusion boundaries 319, 321 has a "near side" and a "far side", wherein the "near side" is that side of the exclusion boundary 319, 321 closest to the base station 301, and the "far side" is that side of the exclusion boundary 319, 321 farthest from the base station 301. That is, because of reports from sensors (not shown in FIG. 3) located within the first, second and third sectors 303, 305, 307, and knowledge about the locations of those sensors, the base station 301 is able to determine the first and second exclusion boundaries 319, 321. It then uses beamforming-related techniques to exclude geographical areas from its service coverage areas, wherein the excluded geographical areas are defined as being those geographical areas that lie on the far side of the exclusion boundary.

Figure 4:
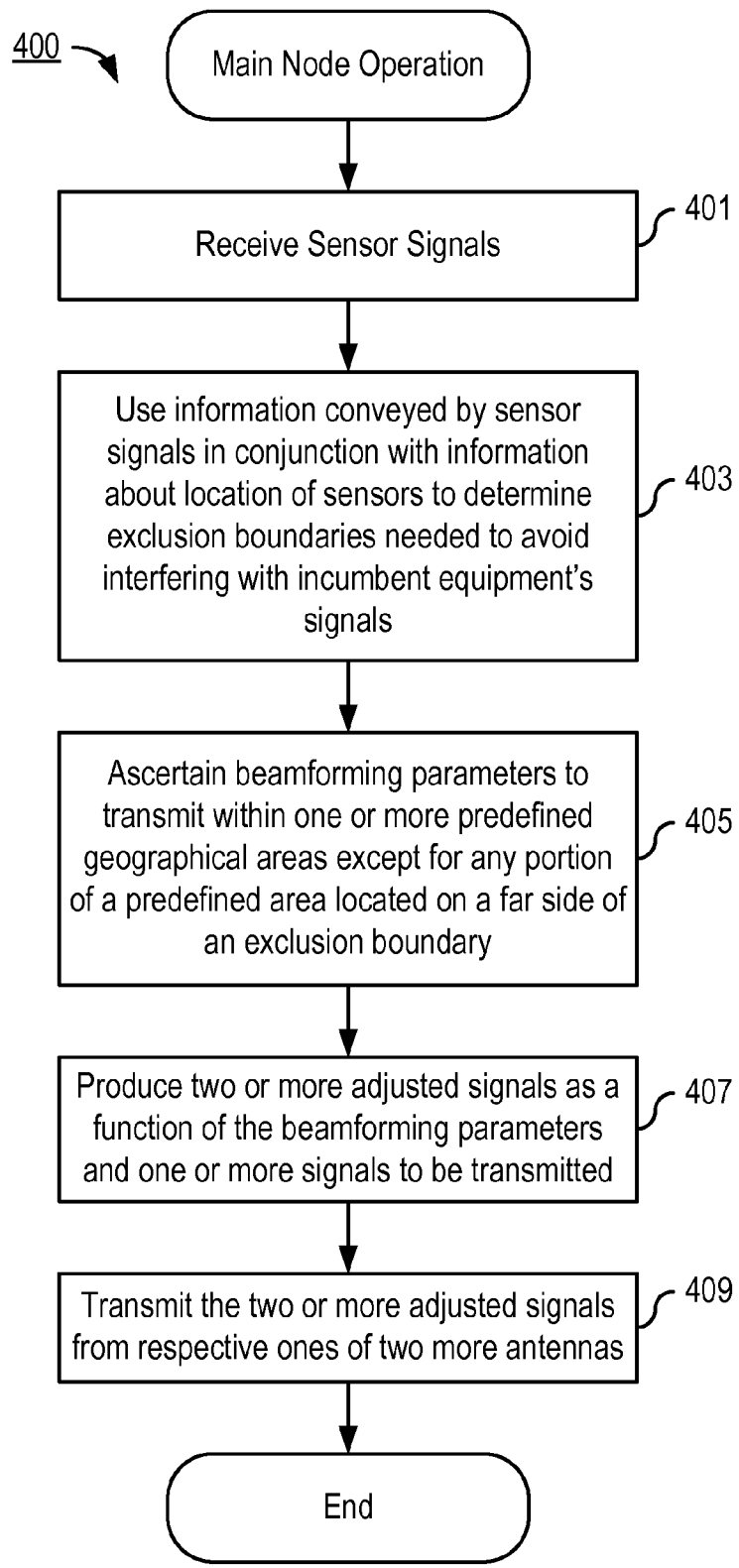
FIG. 4 is, in one respect, a flow chart of steps/processes/functions, carried out by an exemplary main node consistent with the invention to enable the main node to modify its coverage area in a way that avoids interfering with an incumbent system's use, while still providing a meaningful level of service to a remaining geographical area.

FIG. 4 is, in one respect, a flow chart of steps/processes/functions, carried out by an exemplary main node (e.g., a base station in a cellular communications system) consistent with the invention to enable the main node to modify its coverage area in a way that avoids interfering with an incumbent system's use, while still providing a meaningful level of service to a remaining geographical area. In another respect, FIG. 4 can be considered to depict the various elements of circuitry 400 configured to carry out the various functions described in FIG. 4 and its supporting text.

The main node receives sensor signals from the various sensors located within the predefined geographical area (e.g., cell) served by the main node (step 401). The information conveyed by each of the sensor signals provides some sort of indication at least about whether the sensor that generated the sensor signal detected a signal from an incumbent user.

The main node then uses the information conveyed by the sensor signals in conjunction with information about the location of the sensors that generated the sensor signals to determine what, if any, exclusion boundaries are needed to avoid interfering with incumbent equipment's signals (step 403). Of course, if no incumbent equipment's signals are detected, then there will not be any exclusion boundaries and the main node is free to utilize the entire predefined geographical area that it serves.

But, assuming that signals from one or more incumbent equipments have been detected, the shape and location(s) of the exclusion boundaries can be determined in any of a number of ways including, but not limited to, the following alternative embodiments:

If the sensors deliver a single-bit signal (e.g., indicating incumbent detected/not detected) and the density of detectors is low, then the exact shape of the exclusion boundary (or boundaries) may be difficult to determine. In such cases, the exclusion boundary may be approximated as the convex hull of the sensors returning positive signals, plus a guard area. For example, if all of the sensors supplying a positive signal (i.e., signal detected) were to be replaced by vertical poles extending up from the ground, then the convex hull would be defined by the shortest rope that could be spanned around all of the poles. As a further note, if the pattern of poles has concavities (i.e., if concavities would be formed if a line were drawn from each pole to its neighbors) then the rope would not touch all of the poles on its shortest way around them.

If the sensor density is large, the true edges of each exclusion boundary may be determined by observing the boundary where closely-spaced sensors return differing messages. That is, the exclusion boundary will lie somewhere between a sensor reporting detection of an incumbent equipment and a sensor reporting non-detection of an incumbent equipment.

In yet another alternative, if the sensors are configured to also report the detected incumbent signal strength or signal quality measures, then the exclusion boundary can be determined by interpolating or extrapolating the signal strength decay curves.

These are but examples of ways in which the exclusion boundary (or boundaries) can be determined. In practice, those of ordinary skill in the art will readily be able to configure other embodiments if other information (e.g., more precise) information is provided from the sensor regarding characteristics (e.g., signal quality, direction) of the detected incumbent signal.

Assuming that one or more exclusion boundaries are determined, the circuitry in the main node then ascertains beamforming parameters to transmit signals from the main nodes antennas throughout the predefined geographical area (e.g., cell) except for any portion of the predefined geographical area located on the far side of an exclusion boundary (step 405). The details of how to derive these parameters need not be described here because this particular problem reduces to an antenna array or multi-antenna system design problem, the solution to which is well within the capability of one or ordinary skill in the art. However, whereas conventional multi-antenna system design problems relate to directing a beam towards a target area (and therefore focusing the mathematics on the maxima of the resulting antenna directivity patterns), aspects of embodiments consistent with the invention focus on directing transmissions away from a certain area or areas. This means that those of ordinary skill in the art can use known equations, but in this case pay attention to those areas of resulting antenna directivity patterns associated with nulls or close to nulls. It will be appreciated that this may lead to different approximations being used (associated with minima) in embodiments of the invention than are conventionally used when beamforming towards a target area (maximum) is considered.

Two or more adjusted signals are then produced at least as a function of the beamforming parameters and one or more signals to be transmitted (step 407). For example, the beamforming can be applied to at least a portion of the transmitted power, the portion being great enough to, in combination with the resulting transmission antenna pattern, result in only a low, allowed, signal strength being receivable in the exclusion area(s). Each of the adjusted signals is then transmitted from a respective one of two or more antennas associated with the main node (step 409), the result being that the main node's transmitted signals will avoid entering any of the exclusion areas.

Figure 5:
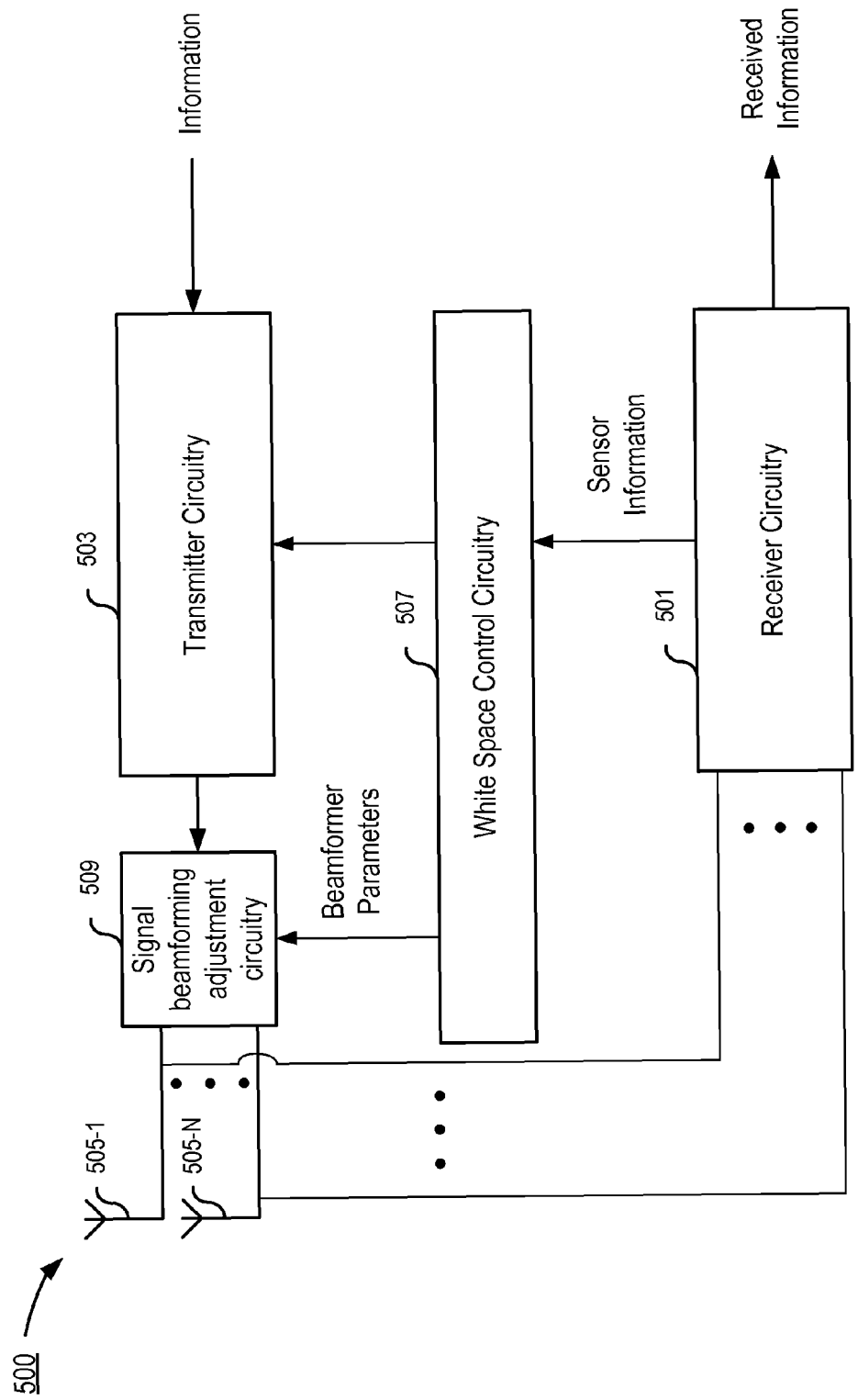
FIG. 5 is a block diagram of an exemplary main node adapted with circuitry configured to carry out various aspects of the invention.

FIG. 5 is a block diagram of an exemplary main node (e.g., base station) 500 adapted with circuitry configured to carry out various aspects of the invention. For the sake of clarity, only those components having particular relevance to the invention are depicted. Those of ordinary skill in the art will readily understand that the main node 500 also includes other circuitry (not depicted) that is well-known in the art and therefore need not be described herein.

The main node 500 operates as a transceiver, and therefore includes receiver circuitry 501 as well as transmitter circuitry 503. For example, when the main node 500 is a base station serving one or more UEs in a mobile communication system, the receiver circuitry 501 receives signals from the UEs in an uplink direction, and the transmitter circuitry generates signals intended for receipt by the UEs in a downlink direction. In this exemplary embodiment, the main node 500 comprises a plurality, N, of antennas 505-1, . . . , 505-N, which are shared between reception and transmission operations. In alternative embodiments, the receiver and transmitter sections of the main node 500 have their own dedicated antennas, with at least the transmitter sections having a plurality of antennas.

The main node 500 further comprises white space control circuitry 507 that generates control signals that cause various circuit elements within the main node 500 to carry out the functions described herein, such as but not limited to the functions depicted in FIG. 4 and described in that figure's corresponding text. The white space control circuitry can be a separate element within the main node 500, or can alternatively be partially or fully integrated with other controller elements within the main node 500.

As mentioned above, the receiver circuitry 501 receives signals from one or more UEs. When the signals are associated with "normal" data communication functions, they are passed along as "received information" for further processing, the particularities of which is beyond the scope of the invention. However, the receiver circuitry 501 also receives sensor signals from the sensors located within the main node's service area (e.g., cell), and extracts the sensor information from these signals. The sensor information is supplied to the white space control circuitry 507 which is configured to determine whether an incumbent equipment has been detected, and if so, what exclusion boundaries are needed to avoid interfering with the incumbent equipment's signals. The white space control circuitry 507 will need to know not only what the sensors are reporting (e.g., "detected"/"not detected"), but also the locations of those sensors. This sensor location information can be included expressly in the sensor information, or alternatively the white space control circuitry 507 can derive sensor location information from other information provided, for example, as part of the sensor information.

The white space controller circuitry 507 then ascertains the beamforming parameters that would enable transmission from of one or more signals from the N antennas 505-1, . . . , 505-N in a manner that serves the entire predefined geographical service area except for any portion of that area that is located on a far side of an exclusion boundary.

To further enable this function in this particular exemplary embodiment (but not necessarily in alternative embodiments), the main node 500 includes signal beamforming adjustment circuitry that receives the signal(s) that would normally be generated by the transmitter circuitry 503, and based on beamformer parameters generated and supplied by the white space control circuitry 507, produces two or more adjusted signals as a function of the beamforming parameters and the one or more signals to be transmitted. These signals are then supplied to respective ones of the N antennas 505-1, . . . , 505-N so that the downlink signal(s) will be transmitted by the main node 500 in a manner that will not enter any of the identified exclusion areas.

The white space controller circuitry 507 can further be adapted in alternative embodiments to perform other functions, such as any one or combination of functions described below. Configuring white space controller circuitry 507 to carry out any of these functions, either through hardwired or programmable means, is well within the capability of one of ordinary skill in the art.

Figure 3:
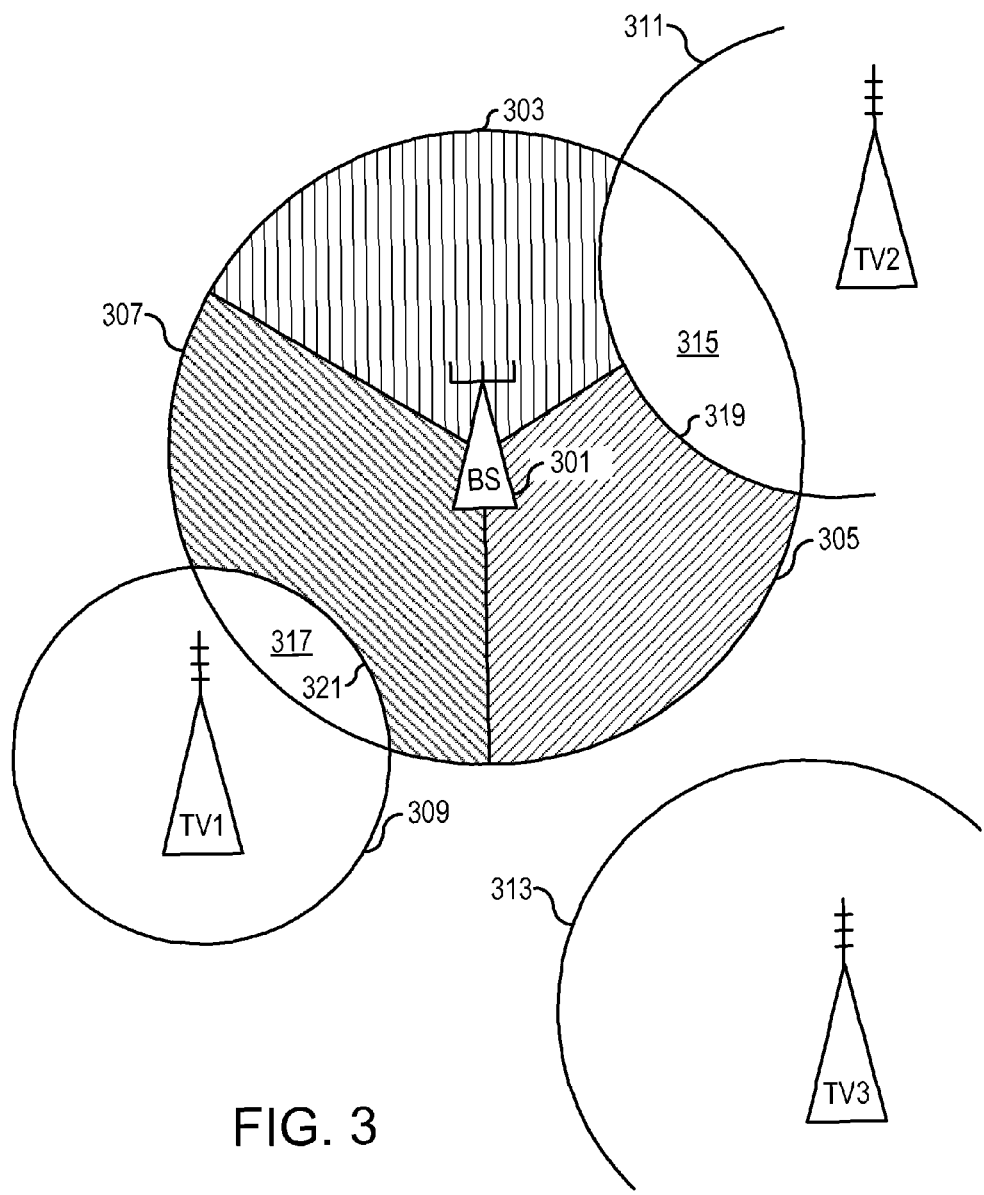
FIG. 3 illustrates a cellular service coverage area configured to avoid interference with an incumbent equipment's service area, in accordance with an aspect of the invention.

Some alternative embodiments do not include the feature wherein complex beamforming is applied to achieve filling the entire available constrained coverage area as illustrated in, for example, FIG. 3. In particular, if the white space is being used as an additional carrier in a multi-carrier system (e.g., to provide a boost in throughput), the beam forming is tailored for a single scheduled user at a time. The incumbent activity area information is then used to determine whether the use of white space spectrum for the given user is permitted, or which parts of it are available. That is, in this scenario only one UE at a time is using the white space carrier; all other UEs in the cell are using non-white space carriers, so no special precautions need to be taken to avoid the service to these other UEs causing interference to an incumbent user. As to the one UE that is using the white space carrier, beamforming is applied not only to avoid transmitting the white space carrier into any portion of the predefined area (e.g., cell) located on a far side of an exclusionary boundary, but also to enhance directivity towards that one user.

In other alternative embodiments, interpreting the reports from the sensors is correlated with information about the white space network's (e.g., the main node's) own transmissions. The presence of a correlation can then be interpreted as a "false alarm", in which the white space network's own transmissions were mistaken for an incumbent equipment transmission.

Another use of this correlation is to verify the beam forming pattern. More particularly, the correlation values can be used to estimate reception conditions of the white space network's own transmissions at different parts of the cell area. These detected reception conditions are compared with what was intended to be achieved by the current beamforming pattern. If it is found that reception of these signals was too strong on the far side of an exclusion boundary, this is an indicator that the model for beamforming is not good enough. The system then responds by, for example, moving that particular exclusion boundary closer to the transmitter, recalculating new beamforming parameters, applying the new parameters, and in some but not necessarily all embodiments, doing this iteratively to arrive at beamforming parameters that are considered to be sufficiently good (i.e., beamforming parameters that achieve transmission results that meet one or more predefined criteria).

In yet another aspect of some embodiments, the white space operator can intentionally use its own signals, preferably before an incumbent equipment is active, to perform beamforming experiments that will better inform how best to generate beamforming parameters. For example, different exclusion boundaries can be hypothesized and the corresponding beamforming parameters computed for these hypothesized exclusion boundaries. The white space operator then employs these during one or more signal transmissions. Sensor reports are then analyzed to determine whether the beamforming parameters achieved the intended results (i.e., of inhibiting transmission on a far side of a hypothesized exclusion boundary). By honing the beamforming algorithms and/or parameters in this way, the guard areas may be made smaller than in other embodiments.

In practice, it may be the case that more than one white space operator is operating in a given white space. In such cases, the various aspects described above can be used not only to carve out sections of a predetermined area that are known to be used by incumbent equipment, but also to identify and then do the same for another white space operator that is detected in the area.

For the sake of simplicity, the above description focused on avoiding interference on a frequency band associated with incumbent equipment. However, in yet another aspect that can be combined with any other embodiments, the idea of using beamforming to avoid exclusion areas associated with incumbent equipment can readily be extended to encompass several frequency bands. In some of such embodiments, the sensors return incumbent activity flags separately for respective ones of several frequency bands (e.g., TV station frequencies that may be active or inactive independent of each other). For each band, the main node (e.g., base station) then determines an appropriate beam pattern and applies it on a per-band basis.

In still another aspect that can be combined with other aspects, the beam patterns are modified as the incumbent activity varies. In this way, not only is the spatial variability used, but also the temporal variability of the incumbent activity is utilized to maximize the white space network capacity.

The various aspects illustrated by the above exemplary embodiments provide significant advantages over prior systems. For example, a typical white space wireless communications network deployment motivation is expected to be extending the available spectrum for an already deployed network, operating in dedicated spectrum. As such, the availability of the extra spectrum in all areas at all times is not critical, but maximizing spatial and temporal coverage is if course highly desirable. Embodiments consistent with the invention provide a tool for doing just that. As a result, utilization of both network capacity and capital expenditure is increased, and the subscribers' user experience is improved.

Also, for greenfield operators that can launch a white space network with some part of spectrum guaranteed by design (e.g., the choice of geographical area), the inventive aspects exemplified by the above-described embodiments provide a way to utilize possible additional white space spectrum that may be sporadically available in the coverage area.

The invention has been described with reference to particular embodiments. However, it will be readily apparent to those skilled in the art that it is possible to embody the invention in specific forms other than those of the embodiment described above. Thus, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating mobile communication system equipment to avoid interfering with another transmitter's use of a spectral resource, wherein the mobile communication system equipment includes a main node that serves a plurality of user equipments, the method comprising:

operating the main node to receive, from each one of two or more remote sensors, sensing information that indicates whether a signal from said another transmitter has been detected, wherein each of the remote sensors is situated at a respective one of two or more sensor locations;

using the sensing information and information about the sensor locations to ascertain one or more exclusion boundaries needed to avoid the main node's transmissions from interfering with said another transmitter's use of the spectral resource;

ascertaining beamforming parameters that will control geometrical coverage limits of the main node's transmissions so as to enable the main node to transmit within one or more predefined geographical areas except for any portion of a predefined area located on a far side of the one or more exclusion boundaries;

producing two or more adjusted signals as a function of the beamforming parameters and one or more signals to be transmitted; and transmitting the two or more adjusted signals from respective ones of two or more antennas.

2. The method of claim 1, comprising:

generating correlation results by correlating information about detected transmissions of said another transmitter with information about contemporaneous transmissions of the mobile communication system; and using the correlation results to detect one or more erroneous indications that the signal from said another transmitter was detected.

3. The method of claim 1, wherein the sensing information indicates whether the signal from said another transmitter has been detected in one frequency band.

4. The method of claim 1, wherein the sensing information indicates whether the signal from said another transmitter has been detected in any of a plurality of frequency bands.

5. The method of claim 4, comprising:

ascertaining beamforming parameters on a per-frequency-band basis, wherein for each frequency band, corresponding beamforming parameters enable the main node to transmit within one or more predefined geographical areas except for any portion of a predefined area located on a far side of one or more exclusion boundaries associated with the frequency band.

6. The method of claim 1, comprising:

modifying beamforming parameters over time in correspondence with modifications in transmission activity of said another transmitter.

7. The method of claim 1, comprising:

receiving, from each one of two or more remote sensors, sensing information that indicates whether a signal transmitted by a transmitter associated with the main node was received at or above a predefined threshold power level in any portion of the predefined area located on the far side of the one or more exclusion boundaries.

8. The method of claim 7, comprising:

adjusting the beamforming parameters if the sensing information does indicate that the signal transmitted by the transmitter associated with the main node was received at or above the predefined threshold power level in any portion of the predefined area located on the far side of the one or more exclusion boundaries.

9. The method of claim 8, comprising:

performing the method iteratively until the sensing information does not indicate that the signal transmitted by the transmitter associated with the main node was received at or above the predefined threshold power level in any portion of the predefined area located on the far side of the one or more exclusion boundaries.

10. An apparatus for operating mobile communication system equipment to avoid interfering with another transmitter's use of a spectral resource, wherein the mobile communication system equipment includes a main node that serves a plurality of user equipments, the apparatus comprising:

circuitry configured to operate the main node to receive, from each one of two or more remote sensors, sensing information that indicates whether a signal from said another transmitter has been detected, wherein each of the remote sensors is situated at a respective one of two or more sensor locations;

circuitry configured to use the sensing information and information about the sensor locations to ascertain one or more exclusion boundaries needed to avoid the main node's transmissions from interfering with said another transmitter's use of the spectral resource;

circuitry configured to ascertain beamforming parameters that will control geometrical coverage limits of the main node's transmissions so as to enable the main node to transmit within one or more predefined geographical areas except for any portion of a predefined area located on a far side of the one or more exclusion boundaries;

circuitry configured to produce two or more adjusted signals as a function of the beamforming parameters and one or more signals to be transmitted; and circuitry configured to transmit the two or more adjusted signals from respective ones of two or more antennas.

11. The apparatus of claim 10, comprising:

circuitry configured to generate correlation results by correlating information about detected transmissions of said another transmitter with information about contemporaneous transmissions of the mobile communication system; and circuitry configured to use the correlation results to detect one or more erroneous indications that the signal from said another transmitter was detected.

12. The apparatus of claim 10, wherein the sensing information indicates whether the signal from said another transmitter has been detected in one frequency band.

13. The apparatus of claim 10, wherein the sensing information indicates whether the signal from said another transmitter has been detected in any of a plurality of frequency bands.

14. The apparatus of claim 13, comprising:

circuitry configured to ascertain beamforming parameters on a per-frequency-band basis, wherein for each frequency band, corresponding beamforming parameters enable the main node to transmit within one or more predefined geographical areas except for any portion of a predefined area located on a far side of one or more exclusion boundaries associated with the frequency band.

15. The apparatus of claim 10, comprising:

circuitry configured to modify beamforming parameters over time in correspondence with modifications in transmission activity of said another transmitter.

16. The apparatus of claim 10, comprising:

circuitry configured to receive, from each one of two or more remote sensors, sensing information that indicates whether a signal transmitted by a transmitter associated with the main node was received at or above a predefined threshold power level in any portion of the predefined area located on the far side of the one or more exclusion boundaries.

17. The apparatus of claim 16, comprising:

circuitry configured to adjust the beamforming parameters if the sensing information does indicate that the signal transmitted by the transmitter associated with the main node was received at or above the predefined threshold power level in any portion of the predefined area located on the far side of the one or more exclusion boundaries.

18. The apparatus of claim 17, comprising:
circuitry configured to operate apparatus circuitry iteratively until the sensing information does not indicate that the signal transmitted by the transmitter associated with the main node was received at or above the predefined threshold power level in any portion of the predefined area located on the far side of the one or more exclusion boundaries.

\* \* \* \* \*

UNITED STATES PATENT AND TRADEMARK OFFICE
CERTIFICATE OF CORRECTION

PATENT NO. : 8,447,237 B2  
APPLICATION NO. : 12/758741  
DATED : May 21, 2013  
INVENTOR(S) : Reial et al.

It is certified that error appears in the above-identified patent and that said Letters Patent is hereby corrected as shown below:

In the Specifications

Column 2, Line 1, delete "al," and insert -- al., --, therefor.

Column 2, Line 3, delete "Vol 1, No 1," and insert -- Vol. 1, No. 1, --, therefor.

Column 5, Line 6, delete "base station 205" and insert -- base station 207 --, therefor.

Column 9, Line 16, delete "beam forming" and insert -- beamforming --, therefor.

Column 9, Lines 39-40, delete "beam forming" and insert -- beamforming --, therefor.

Signed and Sealed this  
Sixth Day of May, 2014

Michelle K. Lee  
*Deputy Director of the United States Patent and Trademark Office*